United States Patent
Champagne et al.

(10) Patent No.: US 9,997,811 B2
(45) Date of Patent: Jun. 12, 2018

(54) BATTERY HEAT EXCHANGE DUCT SYSTEM

(71) Applicant: GM Global Technology Operations LLC, Detroit, MI (US)

(72) Inventors: Randall S. Champagne, Riverview, MI (US); Randy C. Curtis, Macomb, MI (US); Duane D. Kruger, Washington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 287 days.

(21) Appl. No.: 14/931,931

(22) Filed: Nov. 4, 2015

(65) Prior Publication Data

US 2017/0125864 A1  May 4, 2017

(51) Int. Cl.
| | |
|---|---|
| *H01M 10/613* | (2014.01) |
| *H01M 10/6566* | (2014.01) |
| *B60L 11/18* | (2006.01) |
| *H01M 2/10* | (2006.01) |
| *H01M 10/625* | (2014.01) |
| *H01M 10/667* | (2014.01) |
| *H01M 10/6561* | (2014.01) |

(52) U.S. Cl.
CPC ..... *H01M 10/6566* (2015.04); *B60L 11/1874* (2013.01); *H01M 2/1072* (2013.01); *H01M 2/1083* (2013.01); *H01M 10/613* (2015.04); *H01M 10/625* (2015.04); *H01M 10/6561* (2015.04); *H01M 10/667* (2015.04); *H01M 2220/20* (2013.01)

(58) Field of Classification Search
None
See application file for complete search history.

(56) References Cited

U.S. PATENT DOCUMENTS

2010/0276220 A1\* 11/2010 Kubota ............... B60K 1/04
180/68.1

\* cited by examiner

*Primary Examiner* — Sarah A. Slifka
*Assistant Examiner* — Haroon S. Sheikh
(74) *Attorney, Agent, or Firm* — Quinn IP Law

(57) ABSTRACT

Provided herein is a heat exchange assembly for conducting air flow through an air cooled vehicle battery, including: a housing enclosing a battery pack having a plurality of cells; and a manifold operably connected to the housing, wherein the manifold includes an inlet for receiving air flow into the battery pack and an outlet for exhausting air flow out of the battery pack, wherein the inlet and the outlet form a single heat exchange duct that passes through a single opening on a face of the housing. Also provided herein is a vehicle incorporating the disclosed heat exchange assembly and a method of conducting air flow through an air cooled battery in a vehicle.

17 Claims, 16 Drawing Sheets

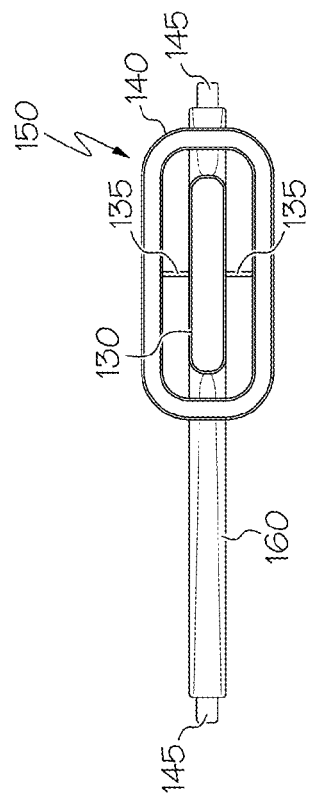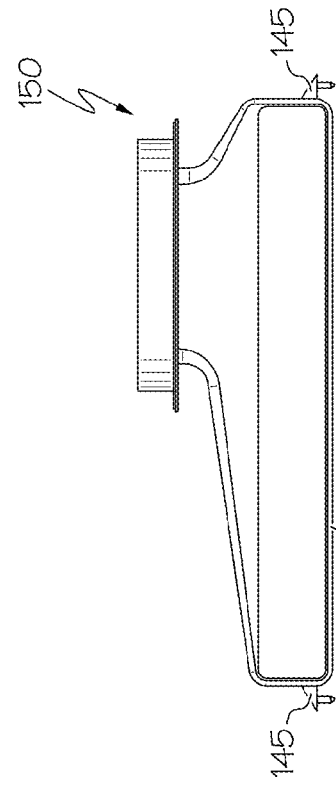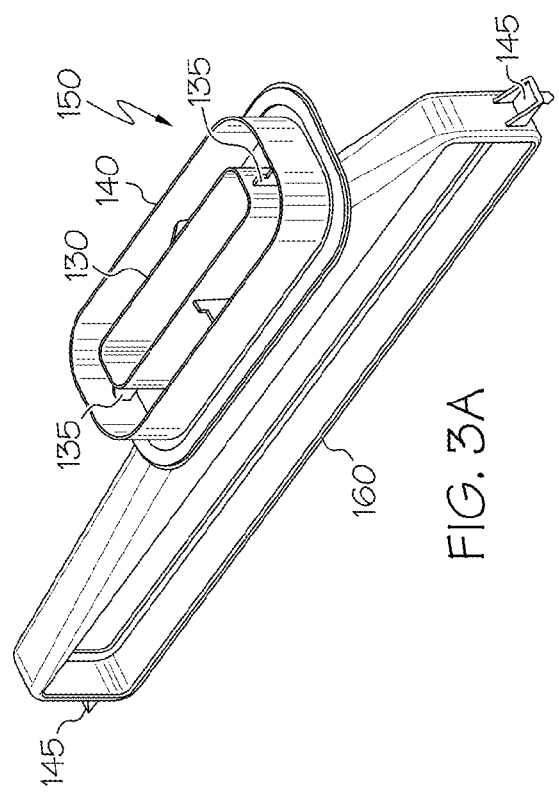

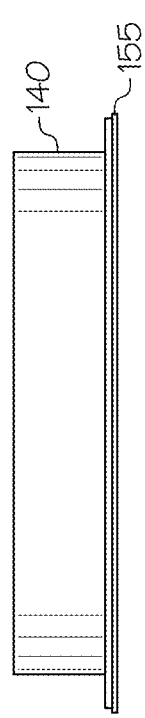
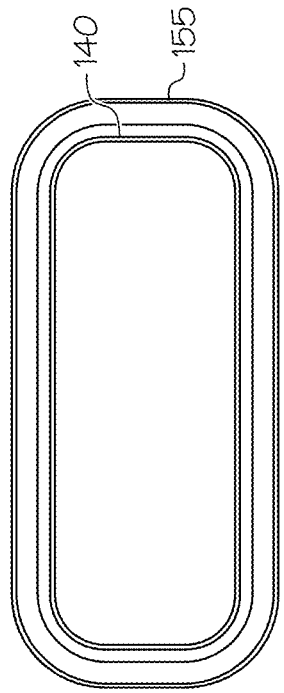
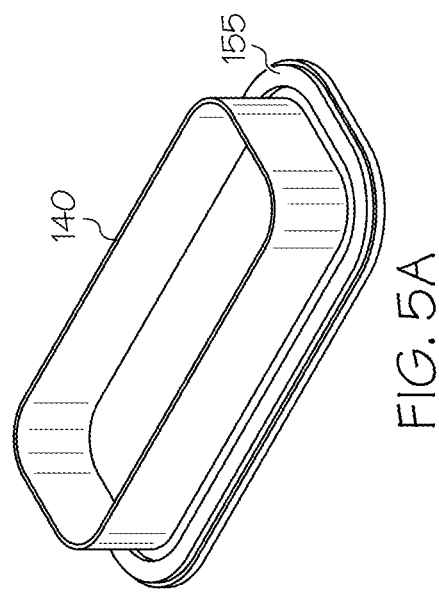

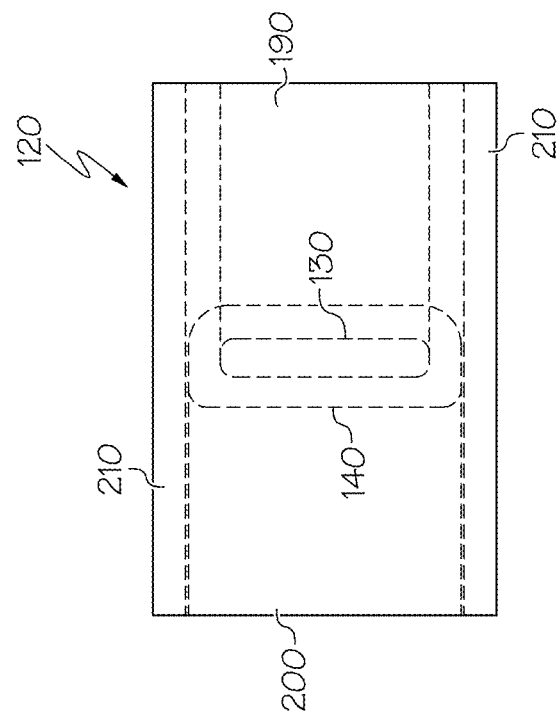
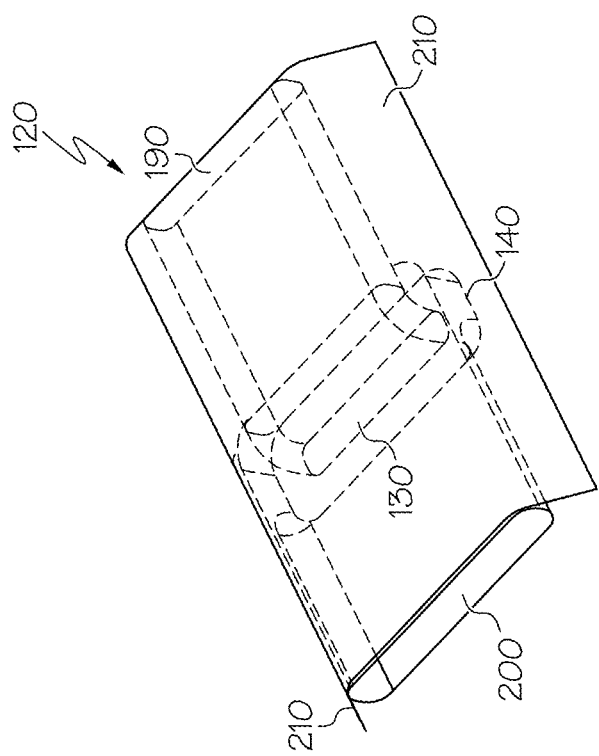

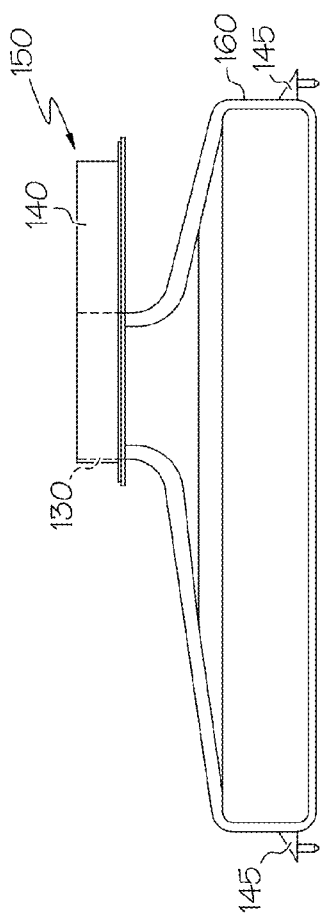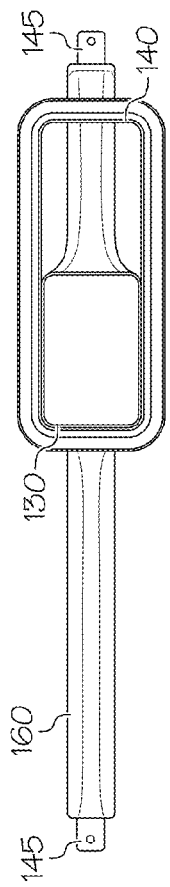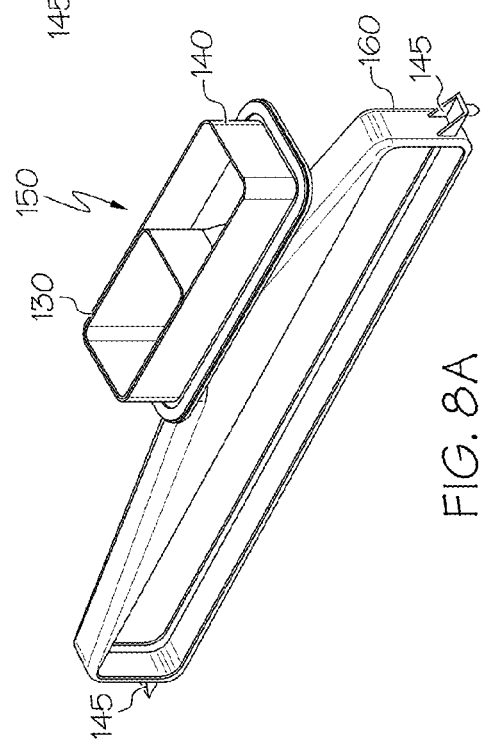
FIG. 8B
FIG. 8C
FIG. 8A

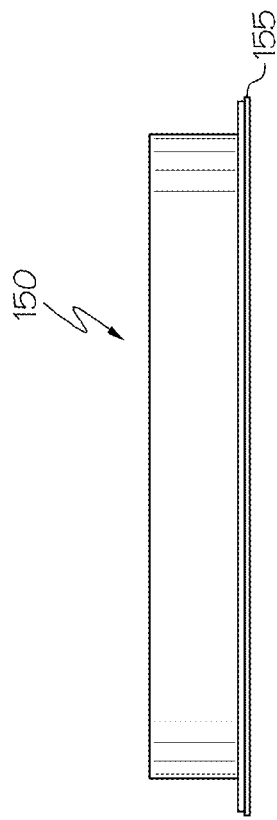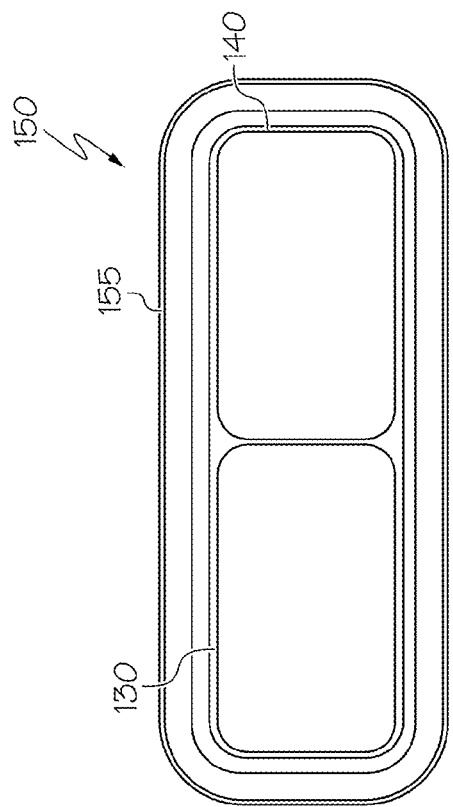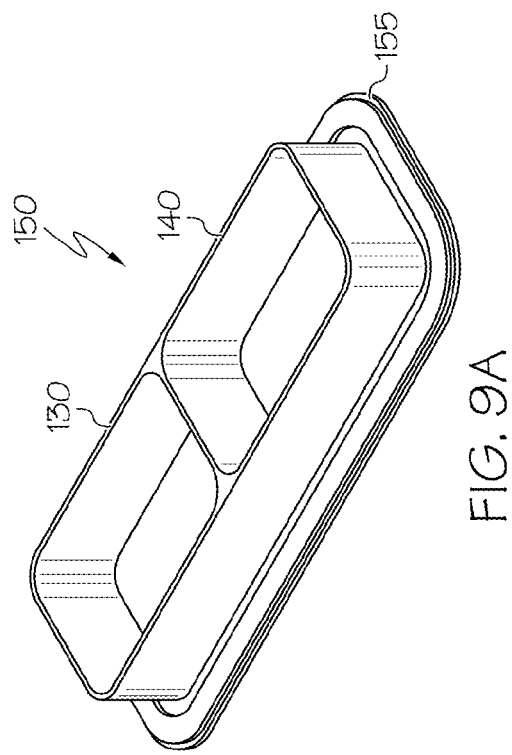

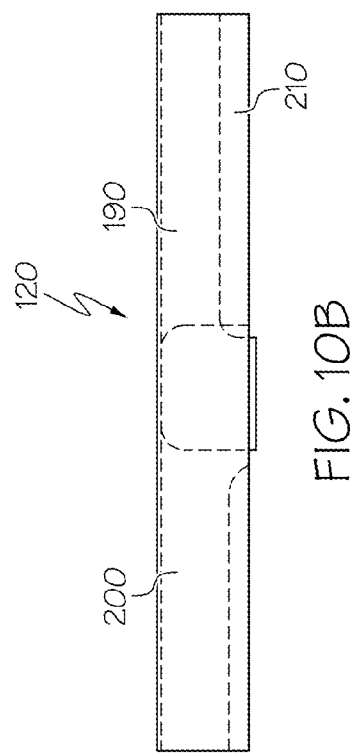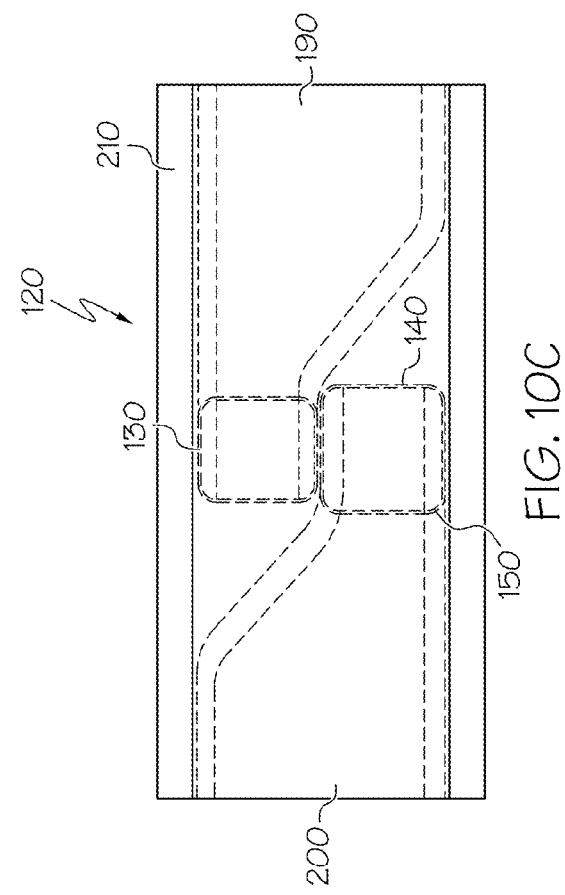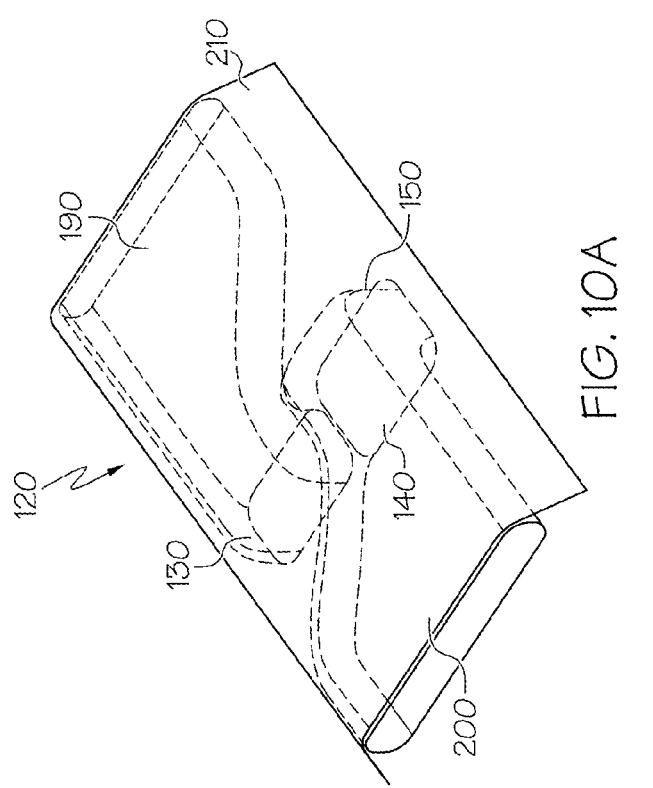

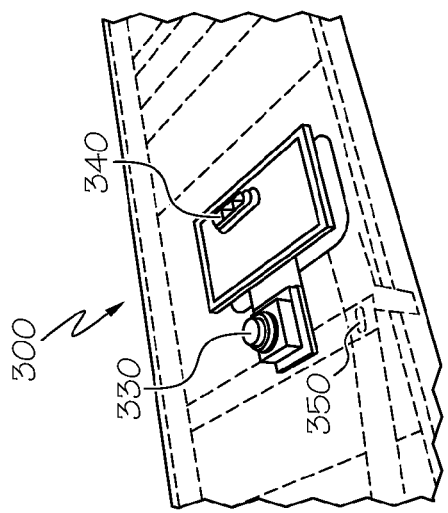
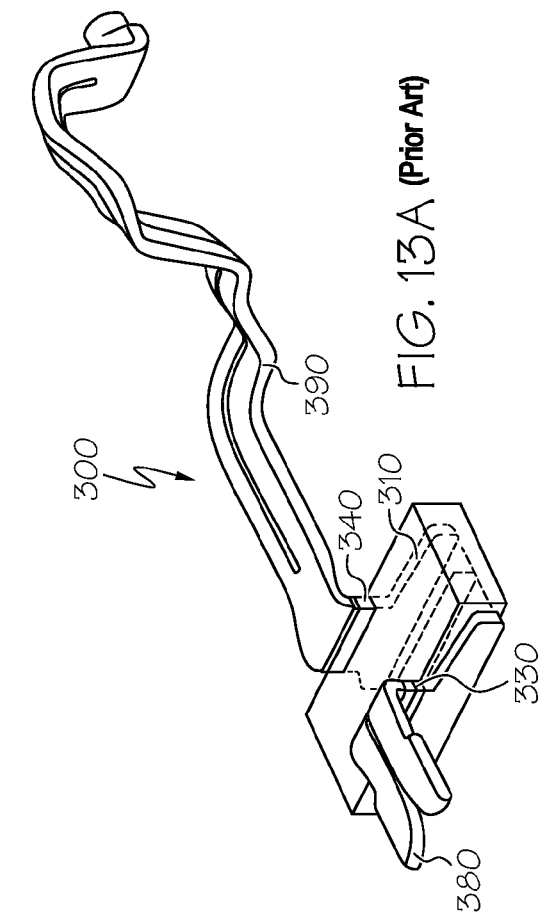
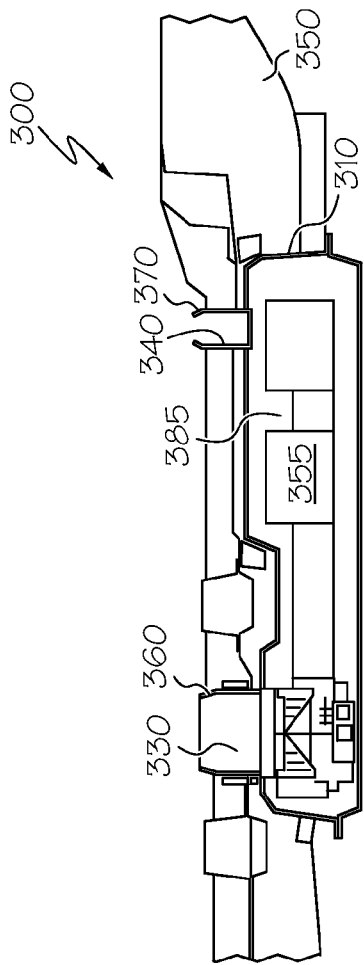
FIG. 13B (Prior Art)
FIG. 13A (Prior Art)
FIG. 13C (Prior Art)

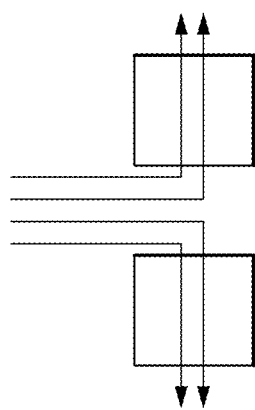
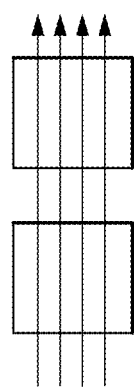

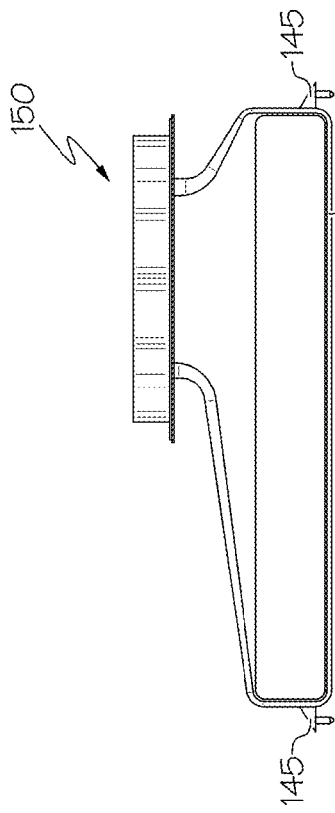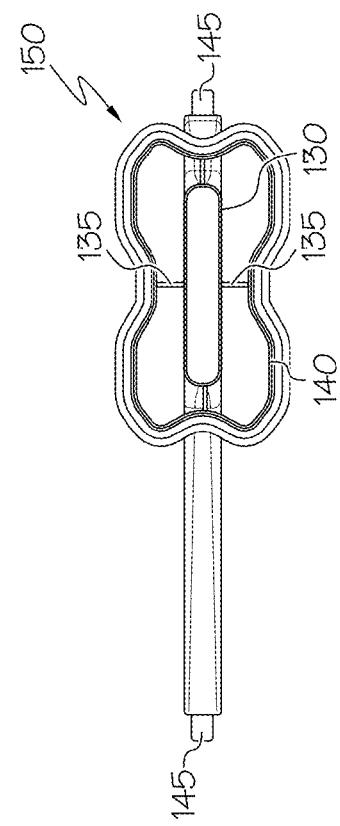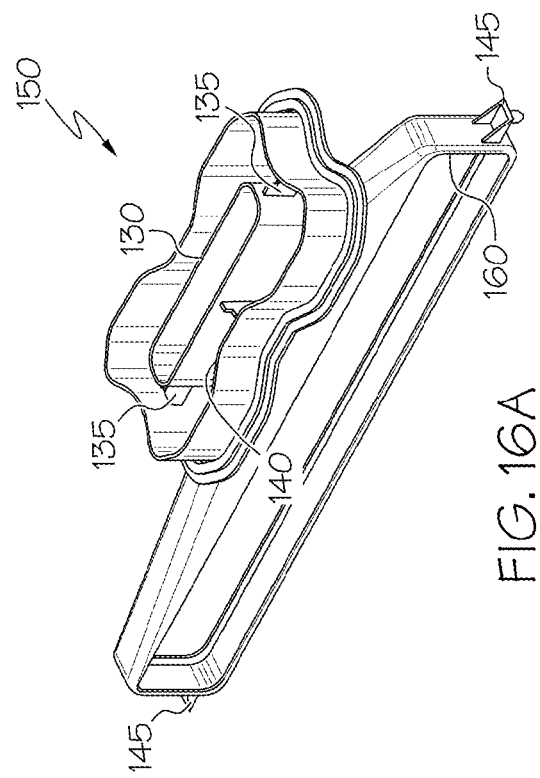

BATTERY HEAT EXCHANGE DUCT SYSTEM

FIELD OF THE INVENTION

This invention relates generally to heat exchange duct systems for cooling air cooled batteries in hybrid vehicles, and more particularly to a heat exchange assembly for conducting air flow to and from an air cooled battery through a single opening in the vehicle body.

BACKGROUND OF THE INVENTION

Lithium-ion and related batteries are being used in automotive and related transportation applications as a way to supplement, in the case of hybrid electric vehicles (HEVs), or supplant, in the case of purely electric vehicles (EVs), conventional internal combustion engines (ICEs). The ability to passively store energy from stationary and portable sources, as well as from recaptured kinetic energy provided by the vehicle and its components, makes such batteries ideal to serve as part of a propulsion system for cars, trucks, buses, motorcycles and related vehicular platforms. In one form suitable for automotive applications, individual battery cells are combined into larger assemblies such that the current or voltage is increased to generate the desired power output. In the present context, larger module and pack assemblies are made up of one or more cells joined in series, parallel or both, and include additional structure to ensure proper installation into the vehicle. Although the term "battery pack" is used herein to discuss a substantially complete battery assembly for use in propulsive power applications, it will be understood by those skilled in the art that related terms—such as "battery unit" or the like—may also be used to describe such an assembly, and that either term may be used interchangeably without a loss in such understanding.

Heat exchange systems are incorporated in order to cool such battery packs. Conventionally, heat exchange has been accomplished by directing air flow through two separate ducts, an inlet duct and an outlet duct. The inlet duct and outlet duct connect to the battery housing through two separate openings, which then requires two separate openings in the vehicle in order for the ducts to pass through. Air flow is conducted to the battery pack through the inlet duct that connects to the battery housing through a first opening in the floor of the vehicle and the battery housing; exhaust air is then directed out of the housing through the outlet duct that connects to the battery housing through a second opening in the housing and floor of the vehicle. Commonly, air enters at the front of the battery pack and exits the back end of the battery pack, thus cooling the battery cells in series.

This conventional design presents various challenges to the manufacture of the vehicle. First, the inlet/outlet arrangement requires at least two openings in the battery housing and floor of the vehicle, which can lead to tolerance and alignment issues in battery mounting. Second, cooling multiple battery cells in series can lead to problems associated with air flow resistance and unfavorable drop in air flow pressure. Third, conventional heat exchange methods and systems require multiple ducts within the battery pack (i.e., intake, intermediate, and exhaust ducts). Further, more complex design (e.g., multiple openings in vehicle body, multiple internal ducts inside battery pack) increases manufacturing costs. Thus, a need exists for an improved heat exchange system that addresses these issues, in order increase efficiency and reduce manufacturing costs and challenges.

SUMMARY OF THE INVENTION

In view of the above challenges, it is an object of the disclosure to provide a heat exchange assembly for conducting air flow to an air cooled battery that integrates the inlet and outlet into a single heat exchange duct, thus reducing the number of pass-throughs required in the battery housing and vehicle body. The heat exchange assembly disclosed herein provides more efficient parallel cooling of battery cells while reducing manufacturing challenges relating to tolerance and alignment in battery mounting.

In one embodiment, a heat exchange assembly for conducting air flow through an air cooled battery is provided, comprising: a housing enclosing a battery pack comprising a plurality of cells; and a manifold operably connected to the housing, wherein the manifold comprises: an inlet for receiving air flow into the battery pack; and an outlet for exhausting air flow out of the battery pack, wherein the inlet and the outlet form a heat exchange duct that passes through a single opening on a face of the housing.

In another embodiment, a method of conducting air flow through an air cooled battery in a vehicle is provided, the method comprising: providing a heat exchange assembly comprising: providing a heat exchange assembly comprising: a sealed housing enclosing a battery pack comprising a plurality of cells; and a manifold operably connected to the housing, wherein the manifold comprises: an inlet for receiving air flow into the battery pack; and an outlet for exhausting air flow out of the battery pack, wherein the inlet and the outlet form a heat exchange duct that passes through a single opening on a face of the housing; conducting air flow through the inlet toward a center of the battery pack; conducting air flow from the center of the battery pack outwardly throughout the plurality of cells toward the sealed housing, wherein the sealed housing forms an exhaust duct that directs air flow to the outlet; and exhausting air flow out the outlet.

These and other objects, features, embodiments, and advantages will become apparent to those of ordinary skill in the art from a reading of the following detailed description and the appended claims.

BRIEF DESCRIPTION OF THE DRAWINGS

The following detailed description of specific embodiments can be best understood when read in conjunction with the following drawings, where like structure is indicated with like reference numerals and in which:

FIGS. 3A-3C depict an embodiment of a heat exchange duct in isolation, including an isometric view (FIG. 3A), a top view (FIG. 3B), and a side view (FIG. 3C).

FIGS. 5A-5C depict an embodiment of an outlet in isolation, including an isometric view (FIG. 5A), a side view (FIG. 5B), and a top view (FIG. 5C).

FIGS. 6A-6B depict an embodiment of a manifold, including an isometric view (FIG. 6A) and a top view (FIG. 6B).

FIGS. 8A-8C depict an embodiment of a heat exchange duct in isolation, including an isometric view (FIG. 8A), a side view (FIG. 8B), and a top view (FIG. 8C).

FIGS. 9A-9C depict an embodiment of a heat exchange duct in isolation, including an isometric view (FIG. 9A), a side view (FIG. 9B), and a top view (FIG. 9C).

FIGS. 10A-10C depict an embodiment of a manifold, including an isometric view (FIG. 10A), a side view (FIG. 10B), and a top view (FIG. 10C).

FIGS. 13A-13C depict a heat exchange system according to the prior art. FIG. 13A depicts an assembly comprising a separate inlet and outlet for conducting air flow according to the prior art. FIG. 13B depicts a prior art system mounted in a vehicle. FIG. 13C depicts a view of a cross-section of a heat exchange system according to the prior art.

FIGS. 14A-14B are a schematic representation of cooling of battery packs configured in series (FIG. 14A) vs. parallel (FIG. 14B). Each square represents a 12-cell module.

FIGS. 16A-16C depict an embodiment of a heat exchange duct in isolation, wherein the outlet is tailored for custom air balancing, including an isometric view (FIG. 16A), a side view (FIG. 16B), and a top view (FIG. 16C).

DETAILED DESCRIPTION OF THE INVENTION

The following discussion of the embodiments of the invention directed to methods and systems for cooling an air cooled battery are exemplary in nature and are not intended to limit the invention or the applications and uses thereof.

The instant embodiments provide a heat exchange assembly for conducting air flow to an air cooled battery that integrates an inlet and an outlet into a single heat exchange duct, thus reducing the number of pass-throughs required in the battery housing and vehicle body to a single pass-through. The heat exchange assembly disclosed herein provides more efficient parallel cooling of a plurality of battery cells while reducing manufacturing costs and challenges associated with tolerance and alignment in battery mounting.

Figure 1:
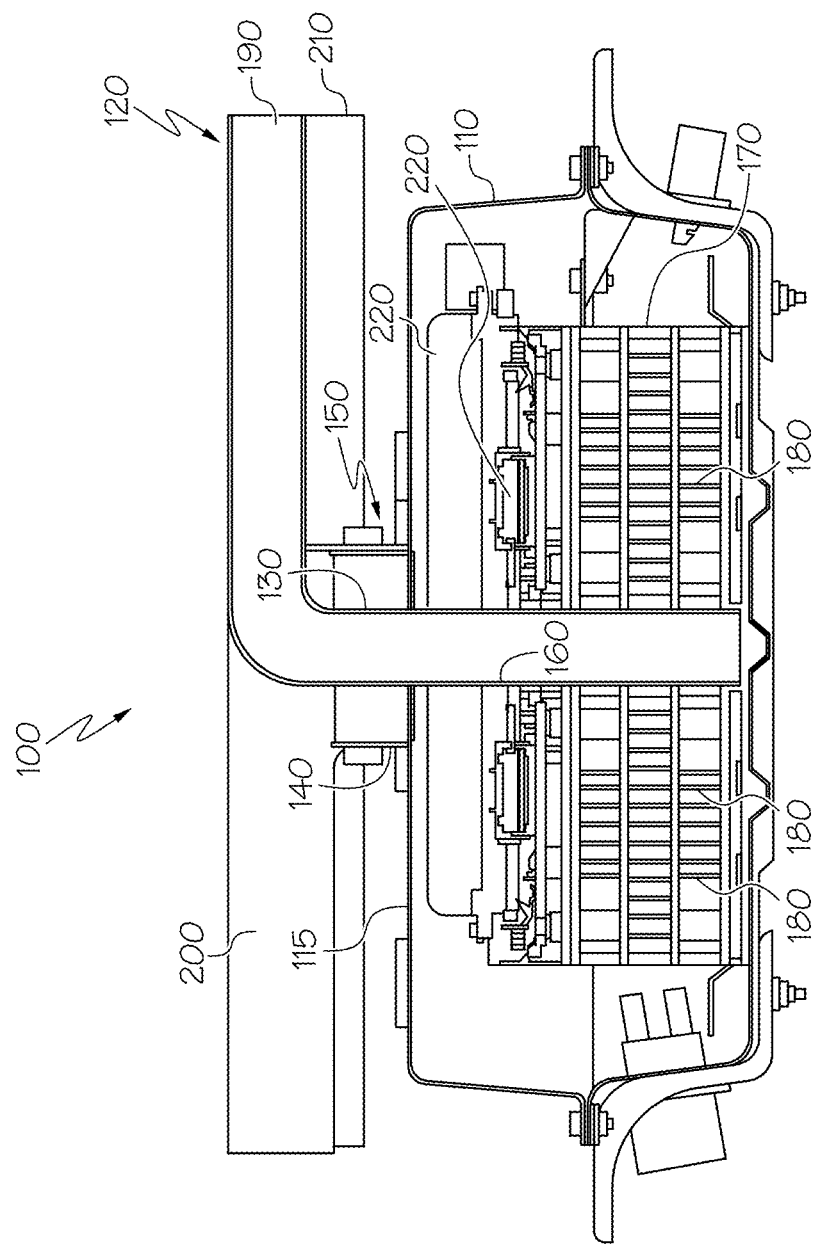
FIG. 1 depicts a view of a cross-section of a heat exchange assembly for conducting air flow through an air cooled battery.
Figure 2:
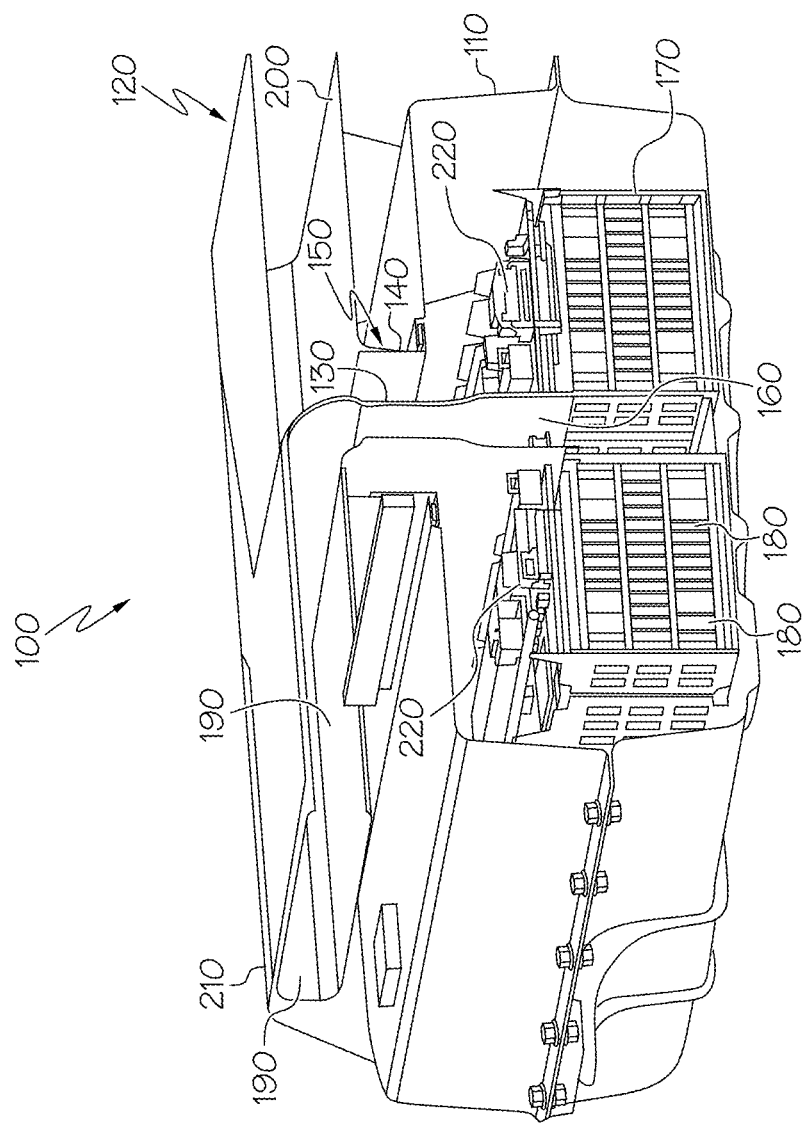
FIG. 2 depicts an isometric view of a cross-section of a heat exchange assembly.

FIGS. 1 and 2 depict a view of a cross-section of a heat exchange assembly 100 for conducting air flow through an air cooled battery. The housing 110 encloses a battery pack 170 comprising a plurality of battery cells 180. The housing 110 is operably connected to the manifold 120, which comprises an inlet 130 for receiving air flow into the battery pack 170 and an outlet 140 for exhausting air flow out of the battery pack 170. The inlet 130 and the outlet 140 form a single integrated heat exchange duct 150, which passes through a single opening on a face of the housing 110. FIGS. 1 and 2 depict the heat exchange duct 150 passing through a single opening on a top face 115 of the housing 110, although it is understood that the heat exchange duct 150 could alternatively pass through a single opening on another face, e.g., a side or bottom face of the housing 110. The housing 110 is sealed such that the sealed housing 110 functions as an exhaust duct for conducting air flow to the outlet 140, without a need for additional ducting within the interior of the housing 110 or battery pack 170.

Air flow originates from a clean side of the vehicle (i.e., a region in the interior of the vehicle where occupants and/or cargo reside). The clean side of the vehicle provides air that has been conditioned from the outside environment, including filtered, heated, and/or cooled air. Air flow originating from the clean side of the vehicle is directed through the inlet 130 to the plurality of cells 180 in parallel. In this way, air flow resistance is decreased and the battery pack 170 is cooled more efficiently, compared to prior art systems that are limited to cooling cells in series. In some embodiments, the inlet 130 extends through a center of the battery pack 170, which facilitates even distribution of air and parallel cooling of the plurality of cells 180. In another embodiment, the inlet 130 comprises a distribution duct 160 disposed at or near the center of the battery pack 170. The distribution duct 160 further facilitates even distribution of air and parallel cooling of the plurality of cells 180.

The manifold 120 further comprises an upper inlet passageway 190 connected to the inlet 130 and an upper outlet passageway 200 connected to the outlet 140. Air flow originating from the clean side of the vehicle is conducted through the upper inlet passageway 190 and inlet 130 into the battery pack 170. The plurality of cells 180 are cooled in parallel as air flows outward from the inlet 130 toward the interior surfaces of the housing 110. The interior surfaces of the sealed housing 110 form a duct which conducts air flow through the outlet 140 and upper outlet passageway 200, where it is exhausted from the battery pack 170.

The manifold 120 further comprises a load protection cover 210 disposed over the upper inlet and outlet passageways 190 and 200, which encloses (partially or completely), protects, and shields at least a portion of the manifold 120 from external pressure and damage.

In certain embodiments, the heat exchange assembly 100 further comprises power electronics 220. Air flow conducted through the battery pack 170 and out the outlet 140 cools the power electronics 220 without the need for additional ducting.

FIGS. 3A-3C depict an embodiment of a heat exchange duct in isolation. In this embodiment, the inlet 130 is enclosed within the outlet 140 and supported by support tabs 135, which secure the inlet 130 and outlet 140 in place. Air flow enters the battery pack (not shown) through the inlet 130 and is exhausted out the outlet 140, which is disposed outside the perimeter of the inlet 130. In some embodiments, the inlet 130 further comprises a distribution duct 160, which facilitates even distribution of air flow and parallel cooling of cells. The inlet further comprises anchor tabs 145 for securing the inlet 130 to the housing. The skilled artisan will appreciate that the shape and contour of the heat exchange duct may be adjusted, based on computer automated engineering (CAE) analysis, in order to promote air flow balance. FIGS. 16A-16C depict an embodiment of a heat exchange duct in isolation, wherein the shape of the outlet is tailored for custom air balancing, and wherein like structures are indicated with like reference numerals.

Figure 4B:
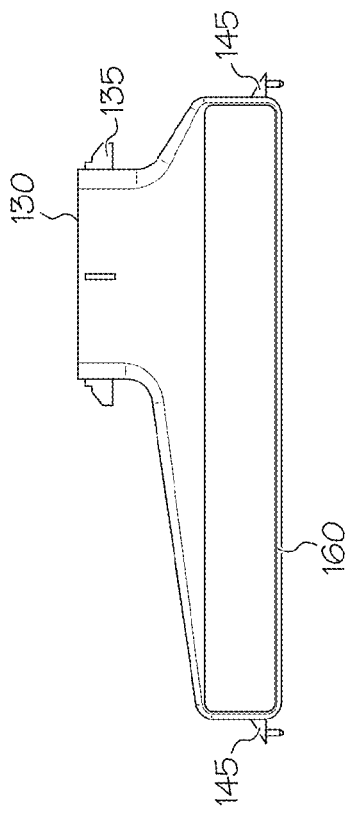
FIGS. 4A-4C depict an embodiment of an inlet in isolation, including an isometric view (FIG. 4A), a side view (FIG. 4B), and a top view (FIG. 4C).
Figure 4C:
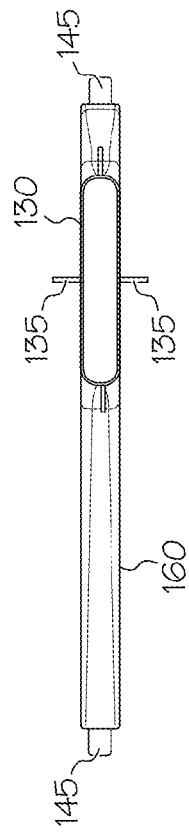
Figure 4A:
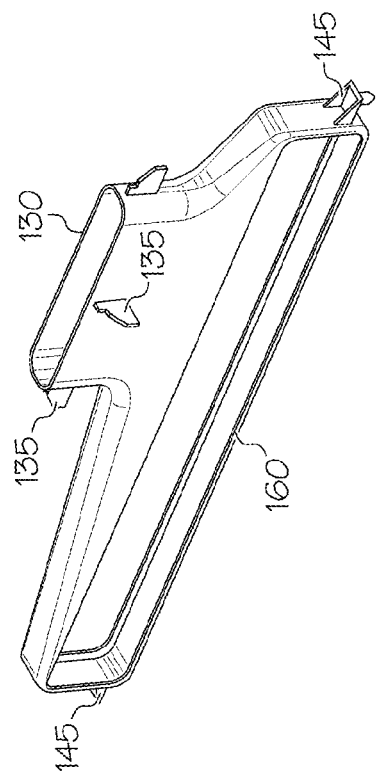

FIGS. 4A-4C depict an embodiment of an inlet 130 in isolation. The inlet 130 comprises support tabs 135 for securing the inlet and the outlet in place and anchor tabs 145 for securing the inlet 130 to the housing 110. An inlet according to FIGS. 4A-4C is configured such that the outlet (not shown) is disposed around the outside perimeter of the inlet 130. In such an embodiment embodiment, the inlet 130 is enclosed within the outlet 140.

FIGS. 5A-5C depict an embodiment of an outlet 140 in isolation. An outlet according to FIGS. 5A-5C is configured such that the outlet is disposed around the outside perimeter of the inlet 130 (not shown), such that the inlet 130 is enclosed within the outlet 140. The outlet 140 further comprises a duct base 155 for securing the outlet 140 and the integrated heat exchange duct (not shown) to the housing of a battery pack.

FIGS. 6A-6B depict an embodiment of a manifold suitable for use with a heat exchange duct wherein the inlet is enclosed within the outlet. The manifold 120 comprises an upper inlet passageway 190 that connects to the inlet 130 and an upper outlet passageway 200 that connects to the outlet 140. A load protection cover 210 is disposed over the upper inlet and outlet passageways 190 and 200 in order to protect and shield at least a portion of the manifold 120 from external pressure.

Figure 7:
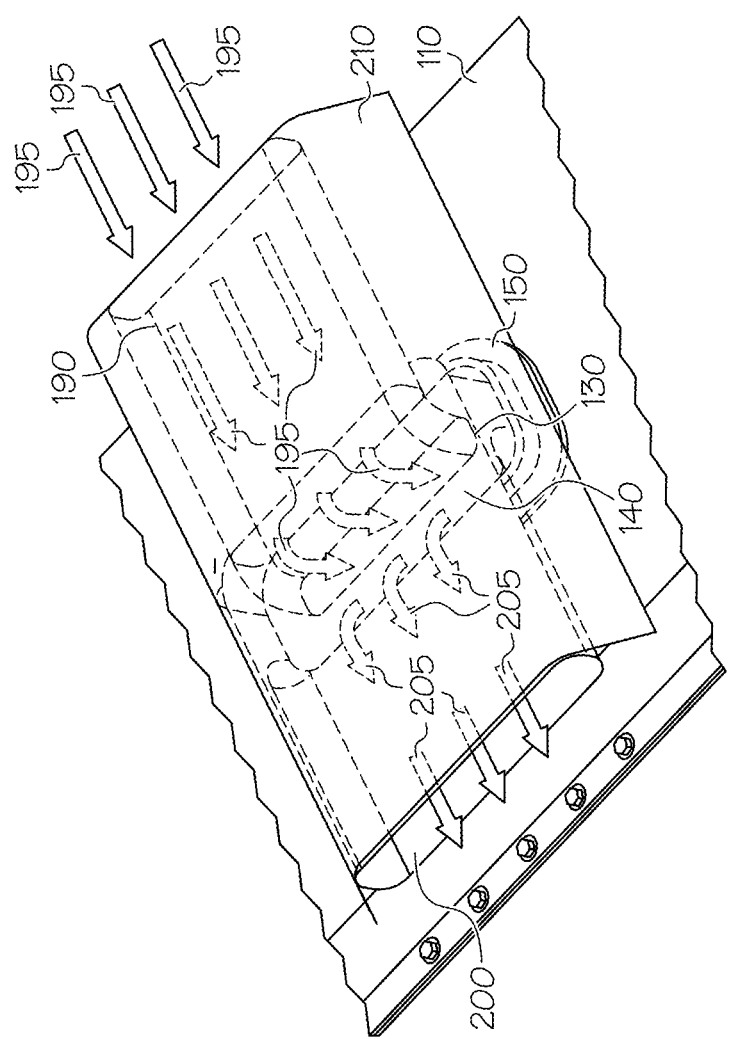
FIG. 7 depicts air flow through an embodiment of a manifold wherein the inlet is enclosed within the outlet on the heat exchange duct.

FIG. 7 is a schematic representation of air flow through an embodiment of the instant heat exchange assembly, wherein heat exchange duct 150 comprises an inlet enclosed within an outlet. The arrows 195 represent inlet air flow entering the upper inlet passageway 190 from the clean side of the vehicle. Inlet air flow 195 is directed through the inlet 130 and inside the housing 110. Air passes through the battery pack (not shown), and then the arrows 205 represent outlet air flow, which is exhausted out the outlet 140 and exits the vehicle through the upper outlet passageway 200.

FIGS. 8A-8C depict an alternative embodiment of a heat exchange duct. In this embodiment, the inlet 130 and the outlet 140 are adjacently disposed on the heat exchange duct 150. The distribution duct 160 is connected to the inlet 130 and facilitates even distribution of air flow and parallel cooling of cells. The inlet 130 further comprises anchor tabs 145 at the base of the inlet 130 or distribution duct 160 for securing the inlet 130 to the housing.

FIGS. 9A-9C depict an alternative embodiment of a heat exchange duct 150 in isolation, wherein the inlet 130 and outlet 140 are adjacently disposed. The heat exchange duct 150 comprises a duct base 155 for securing the heat exchange duct to the housing of a battery pack.

FIGS. 10A-10C depict an alternative embodiment of a manifold 120, wherein the inlet 130 and the outlet 140 are adjacently disposed on the heat exchange duct 150. The manifold 120 comprises an upper inlet passageway 190 that connects to the inlet 130 and an upper outlet passageway 200 that connects to the outlet 140. A load protection cover 210 is disposed over the upper inlet and outlet passageways 190 and 200 in order to protect and shield at least a portion of the manifold 120 from external pressure.

Figure 11:
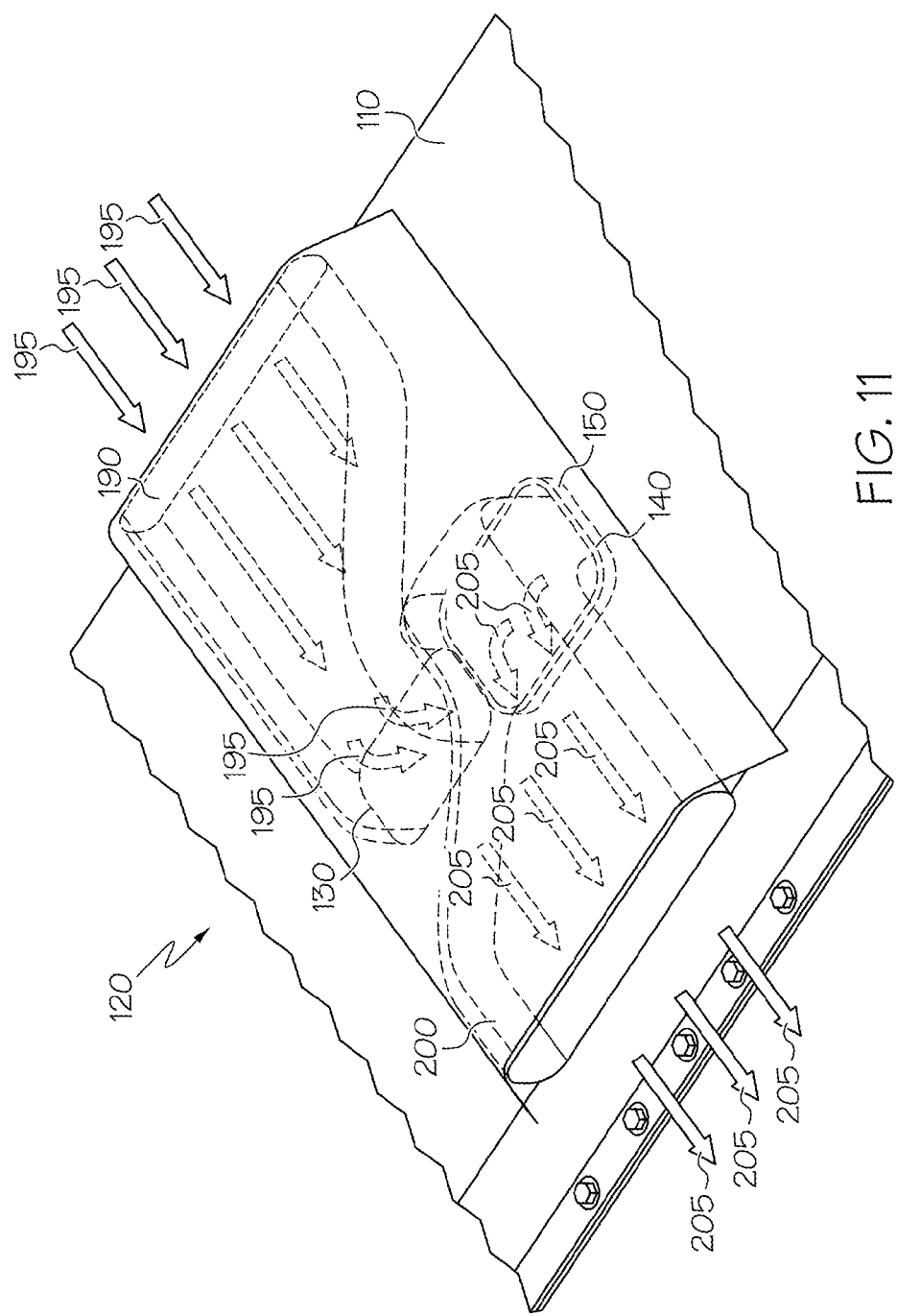
FIG. 11 depicts air flow through an embodiment of a manifold wherein the inlet and outlet are adjacently disposed on the heat exchange duct.

FIG. 11 is a schematic representation of air flow through an embodiment of the instant heat exchange assembly, wherein heat exchange duct 150 comprises an inlet 130 and an outlet 140 adjacently disposed. The arrows 195 represent inlet air flow entering the upper inlet passageway 190 from the clean side of the vehicle. Inlet air flow 195 is directed through the inlet 130 and inside the housing 110. Air passes through the battery pack (not shown) and the arrows 205 represent outlet air flow, which is exhausted out the outlet 140 and exits the vehicle through the upper outlet passageway 200.

Figure 12:
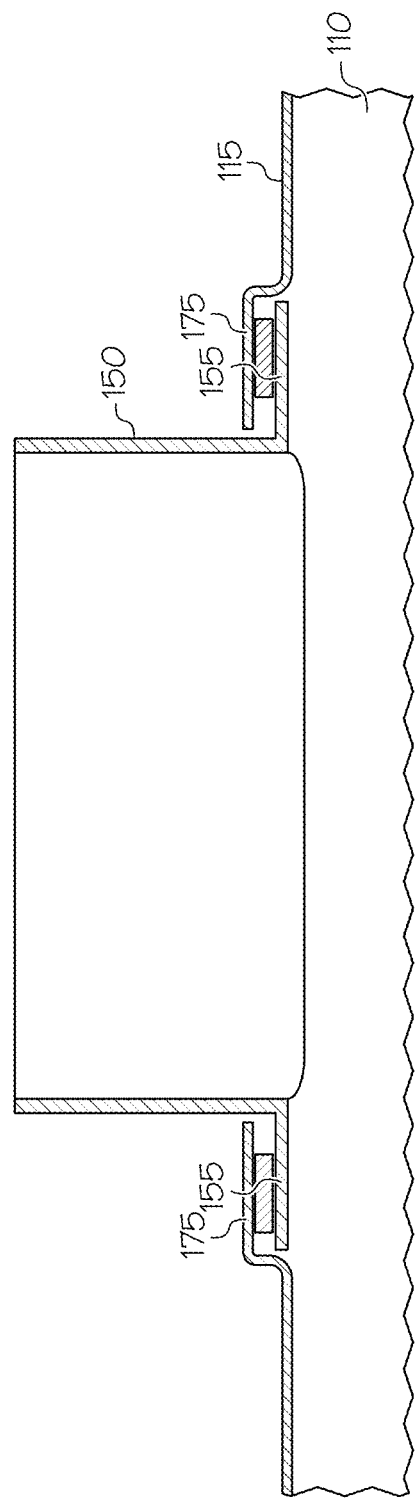
FIG. 12 depicts a view of a cross-section of a heat exchange duct seated on a battery housing.

FIG. 12 depicts a view of a cross-section of a heat exchange duct 150 seated on a top face 115 of a battery housing 110. The heat exchange duct 150 comprises a duct base 155, which is seated under the housing lips 175 of the housing 110. The duct 150 is sealed to the housing 110 in order to reduce leakage of air flow.

Referring to FIGS. 13A-13C, details depicting a portion of a prior art heat exchange assembly 300 are shown, wherein the housing 310 and vehicle body 350 each have two openings 360 and 370 (FIG. 13C) for accommodating each of an inlet 330 and an outlet 340, respectively. The inlet duct 380 is connected to the inlet 330 and the outlet duct 390 is connected to the outlet 340 (FIG. 13A). Air enters the inlet duct 380 and is conveyed to the battery pack 355 comprising a plurality of cells (not shown) (FIG. 13C). The air cools the cells in series as it is conducted through intermediate duct 385 within the battery pack and out the battery pack through the outlet 340, after which it is exhausted from the vehicle through the outlet duct 390 (FIG. 13C). The above approach to air cooling requires at least two openings in the battery housing 310 and the vehicle body 350, specifically the floor of the vehicle, and three ducts, including the inlet, intermediate, and outlet ducts, which adds complexity to the manufacturing process and increases the risk of problems associated with tolerance and alignment when mounting the battery in the vehicle. Further, cooling the cells in series is less efficient and leads to potential problems associated with air flow resistance and pressure drop.

Figure 15:
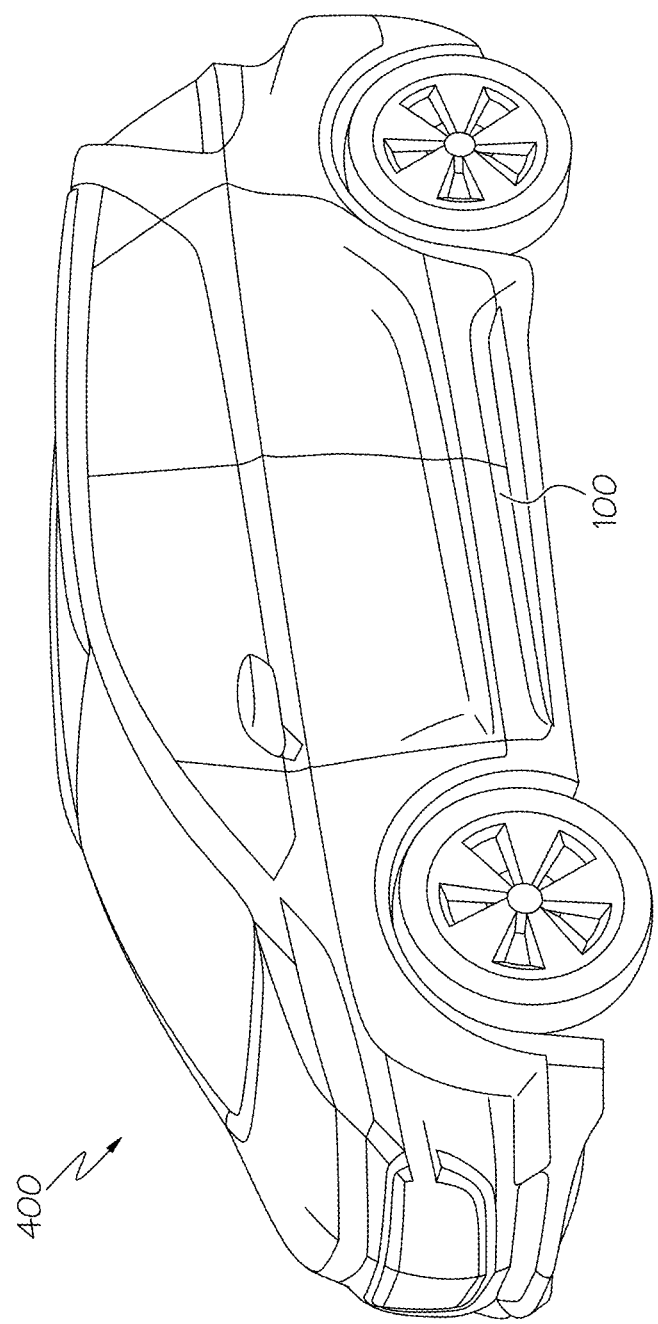
FIG. 15 depicts a vehicle comprising an embodiment of heat exchange assembly disclosed herein.

Also provided herein is a vehicle comprising a heat exchange assembly according to any of the embodiments disclosed herein, wherein the heat exchange duct passes through a single opening in a vehicle body. FIG. 15 depicts a vehicle 400 having a heat exchange assembly 100 disposed under the floor of the vehicle body, such that the heat exchange duct and/or manifold, including the upper inlet and outlet passageways, passes through a single opening in the vehicle body.

Also provided herein is a method of air flow through an air cooled battery in a vehicle, the method comprising: providing a heat exchange assembly comprising: a sealed housing enclosing a battery pack comprising a plurality of cells; and a manifold operably connected to the housing, wherein the manifold comprises: an inlet for receiving air flow into the battery pack; and an outlet for exhausting air flow out of the battery pack, wherein the inlet and the outlet form a heat exchange duct that passes through a single opening on a face of the housing; conducting air flow through the inlet toward a center of the battery pack; conducting air flow from the center of the battery pack outwardly throughout the plurality of cells toward the sealed housing, wherein the sealed housing forms an exhaust duct that directs air flow to the outlet; and exhausting air flow out the outlet. In one embodiment, air flow is conducted to and from the air cooled battery through a single opening in a vehicle body. In a more specific embodiment, the single opening is an opening in the floor of the vehicle body. Air flow is conducted to the plurality of cells in parallel.

In another embodiment, air flow exhausted from the outlet cools power electronics without the need for additional ducting inside the housing.

In one embodiment, the inlet is enclosed within the outlet on the heat exchange duct, such that air flow is conducted to and from the battery pack through a single opening on a face of the housing. In another embodiment, the inlet and the outlet are adjacently disposed on the heat exchange duct, such that air flow is conducted to and from the battery pack through a single opening on a face of the housing. In certain embodiments, the single opening on a face of the housing is an opening on a top face of the housing.

EXAMPLE

The following example is given by way of illustration and is not intended to limit the scope of the present invention.

Example 1

Comparison of Battery Cooling Flow Pressure Drop

A computer model was employed to illustrate the relationship between channel flow rate and pressure drop between two battery pack cooling configurations: (1) a battery pack comprising two 12-cell modules cooled in series and (2) a battery pack comprising two 12-cell modules cooled in parallel. FIG. 14 is a schematic representation of series (FIG. 14A) vs. parallel (FIG. 14B) cooling configurations, wherein arrows represent air flow direction. Data and parameters are set forth in Table 1:

TABLE 1

Comparison of Series vs. Parallel Cooling

|  | Series Cooling | Parallel Cooling |
| --- | --- | --- |
| Channel Cooling Flow | 2 CFM | 1 CFM |
| Pressure Loss through One Module | 140 Pa | 40 Pa |
| Cooling Path | Two module length | One module length |
| Total Pressure Loss (Pressure Drop through One Module * Cooling Path) | 280 Pa | 40 Pa |

Results indicate a significantly greater total pressure drop (280 Pa) in the series configuration, as compared with the parallel configuration (40 Pa).

While particular embodiments of the present invention have been illustrated and described, it would be obvious to one skilled in the art that various other changes and modifications can be made without departing from the spirit and scope of the invention. It is therefore intended to cover in the appended claims all such changes and modifications that are within the scope of this invention.

We claim:

1. A heat exchange assembly for conducting air flow through an air cooled battery, comprising:
   a housing enclosing a battery pack comprising a plurality of cells; and
   a manifold operably connected to the housing, wherein the manifold comprises:
      an inlet for receiving air flow into the battery pack; and
      an outlet for exhausting air flow out of the battery pack, wherein the inlet and the outlet form a heat exchange duct that passes through a single opening on a face of the housing.

2. The heat exchange assembly according to claim 1, wherein the housing is sealed such that the housing forms an exhaust duct for conducting air flow to the outlet.

3. The heat exchange assembly according to claim 1, wherein the inlet extends through a center of the battery pack, such that air flow is directed to the plurality of cells in parallel.

4. The heat exchange assembly according to claim 1, wherein the inlet comprises a distribution duct disposed in the center of the battery pack, such that air flow is directed to the plurality of cells in parallel.

5. The heat exchange assembly according to claim 1, wherein the inlet is enclosed within the outlet on the heat exchange duct.

6. The heat exchange assembly according to claim 1, wherein the inlet and the outlet are adjacently disposed on the heat exchange duct.

7. The heat exchange assembly according to claim 1, wherein the manifold comprises an upper inlet passageway connected to the inlet and an upper outlet passageway connected to the outlet.

8. The heat exchange assembly according to claim 1, further comprising a load protection cover enclosing the manifold.

9. The heat exchange assembly according to claim 1, wherein the heat exchange duct passes through the single opening on a top face of the housing.

10. A vehicle comprising the heat exchange assembly according to claim 1, wherein the heat exchange duct passes through a single opening in a vehicle body.

11. A vehicle comprising the heat exchange assembly according to claim 10, further comprising power electronics, wherein air flow conducted through the battery pack and out the outlet cools said power electronics without additional ducting.

12. A method of conducting air flow through an air cooled battery in a vehicle, the method comprising:
   providing a heat exchange assembly comprising:
      a sealed housing enclosing a battery pack comprising a plurality of cells; and
      a manifold operably connected to the housing, wherein the manifold comprises:
         an inlet for receiving air flow into the battery pack; and
         an outlet for exhausting air flow out of the battery pack, wherein the inlet and the outlet form a heat exchange duct that passes through a single opening on a face of the housing;
   conducting air flow through the inlet toward a center of the battery pack;
   conducting air flow from the center of the battery pack outwardly throughout the plurality of cells toward the sealed housing, wherein the sealed housing forms an exhaust duct that directs air flow to the outlet; and
   exhausting air flow out the outlet.

13. The method of claim 12, wherein air flow is conducted to and from the air cooled battery through a single opening in a vehicle body.

14. The method of claim 12, wherein air flow is conducted to the plurality of cells in parallel.

15. The method of claim 12, wherein air flow exhausted from the outlet cools power electronics without additional ducting.

16. The method of claim 12, wherein the inlet is enclosed within the outlet on the heat exchange duct, such that air flow is conducted to and from the battery pack through a single opening on a face of the housing.

17. The method of claim 12, wherein the inlet and the outlet are adjacently disposed on the heat exchange duct, such that air flow is conducted to and from the battery pack through a single opening on a face of the housing.

* * * * *